United States Patent [19]

Bässler et al.

[11] Patent Number: 4,769,157
[45] Date of Patent: Sep. 6, 1988

[54] PROCESS FOR THE THERMAL TREATMENT OF SLUDGES

[75] Inventors: Jürgen Bässler; Heinrich Steuber, both of Dortmund; Winfried Liebig, Iserlohn, all of Fed. Rep. of Germany

[73] Assignee: Uhde GmbH, Fed. Rep. of Germany

[21] Appl. No.: 117,914

[22] Filed: Nov. 3, 1987

Related U.S. Application Data

[63] Continuation of Ser. No. 749,177, Jun. 26, 1985, abandoned.

[30] Foreign Application Priority Data

Jun. 27, 1984 [DE] Fed. Rep. of Germany ....... 3423620

[51] Int. Cl.$^4$ .............................................. C02F 11/06
[52] U.S. Cl. ................................... 210/758; 210/771; 210/774
[58] Field of Search ............... 210/609, 758, 761, 765, 210/766, 769–771, 774, 805, 806

[56] References Cited

U.S. PATENT DOCUMENTS

| | | | |
|---|---|---|---|
| 3,591,448 | 7/1971 | Hess et al. | 210/774 X |
| 4,010,098 | 3/1977 | Fassell | 210/758 X |
| 4,050,390 | 9/1977 | Hora et al. | 210/771 X |
| 4,132,640 | 1/1979 | Filzmoser | 210/771 X |
| 4,321,150 | 3/1982 | McMullen | 210/771 X |
| 4,330,411 | 5/1982 | Florin et al. | 210/771 X |
| 4,441,437 | 4/1984 | Moskau | 210/758 X |
| 4,636,318 | 1/1987 | Baker | 210/774 X |

Primary Examiner—Tom Wyse
Attorney, Agent, or Firm—Toren, McGeady & Associates

[57] ABSTRACT

A process for the thermal treatment of carbon-containing substances, in particular of sludges which, after mechanical indirect pre-drying, are subjected to direct drying by means of drying gas is disclosed. Object of the invention is to simplify the elimination of the noxious matter contained in the sewage sludge, to allow for energy recovery, and to improve the efficiency of the entire process. The problem is solved by the fact that the drying gas used for direct sludge drying is recovered by partial oxidation of the sludge subjected to direct drying.

5 Claims, 2 Drawing Sheets

PROCESS FOR THE THERMAL TREATMENT OF SLUDGES

This is a continuation of application Ser. No. 749,177, filed June 26, 1985, now abandoned.

BACKGROUND OF THE INVENTION

1. Field of the Invention

The invention relates to a process for the thermal treatment of carbon-containing substances, in particular, of sludges which after mechanical indirect predrying, are subjected to direct drying by means of drying gas.

2. Description of the Prior Art

The journal "cay" (chemie-anlagen+verfahren), May 1984, pages 50 and 146, discloses a procedure wherein mechanically pre-dehydrated sewage sludge is dried in a fluidized bed before being burned. The particular disadvantage of this procedure is that the dried sludge is burned in a single stage. Thus, noxious substances, e.g., $SO_2$, $NO_x$, dust, and heavy metals, are present, in relatively large amounts, in the flue gas from which they have to be separated. The entire amount of ashes produced is also entrained with the flue gas stream. A further disadvantage of the known procedure is the formation of odorous substances during drying of the sewage sludge by the hot flue gases. These substances have to be subjected to an energy consuming post-combustion or to an expensive gas purification.

SUMMARY OF THE INVENTION

We have discovered a method for eliminating the disadvantages described above which simplifies the destruction of the noxious material contained in sewage sludge and allows energy recovery, resulting in improved efficiency for the entire procedure.

In accordance with the present invention, this is accomplished by using, as the drying gas for direct drying of the sludge, the gas obtained by partial oxidation of the sludge which has been subjected to direct drying.

A combustible gas is obtained from the partial oxidation and since the sludge drying equipment used can be of very compact construction, it is much easier to remove the noxious material contained in the sewage sludge and entrained with the drying gas. This is because the gas flow in this procedure is reduced to about half the quantity which would be obtained when using a conventional single-stage complete combustion with air. As experiments have shown, this amount can even be reduced to about one fourth, when oxygen is used for combustion.

DESCRIPTION OF THE PREFERRED EMBODIMENTS

Figure 1:
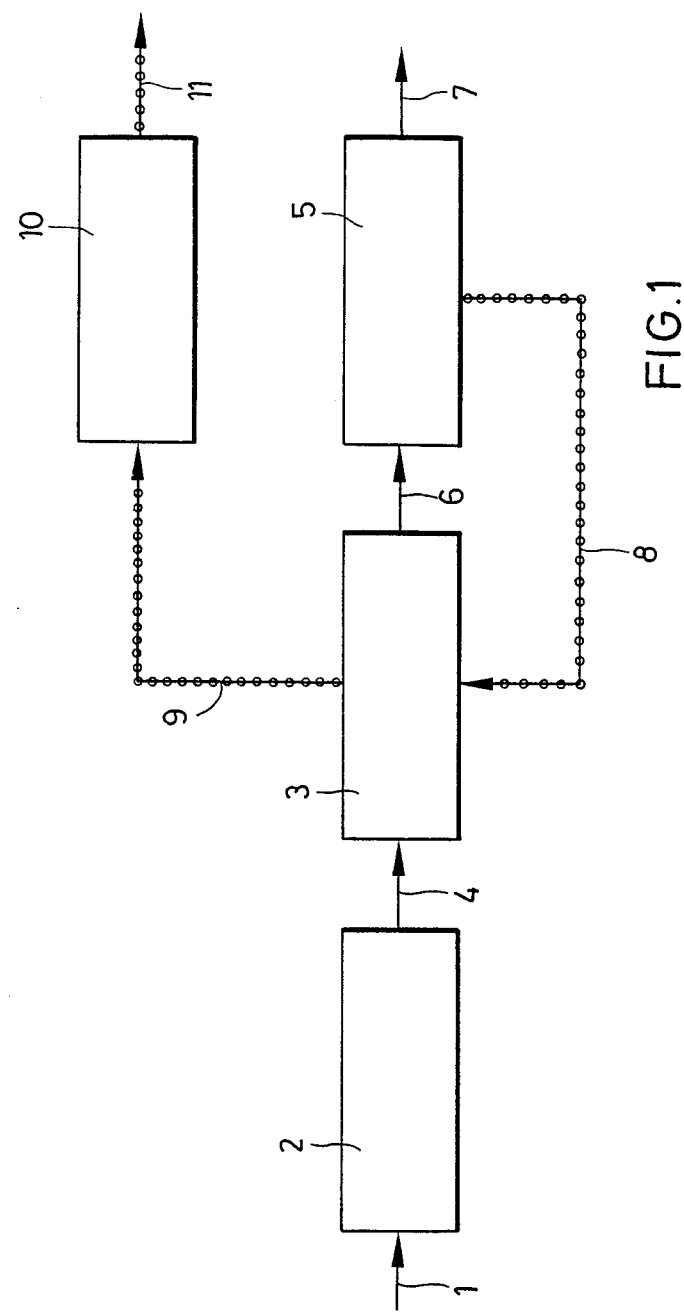
FIGS. 1 and 2 are schematic drawings of a process in accordance with the present invention.
Figure 2:
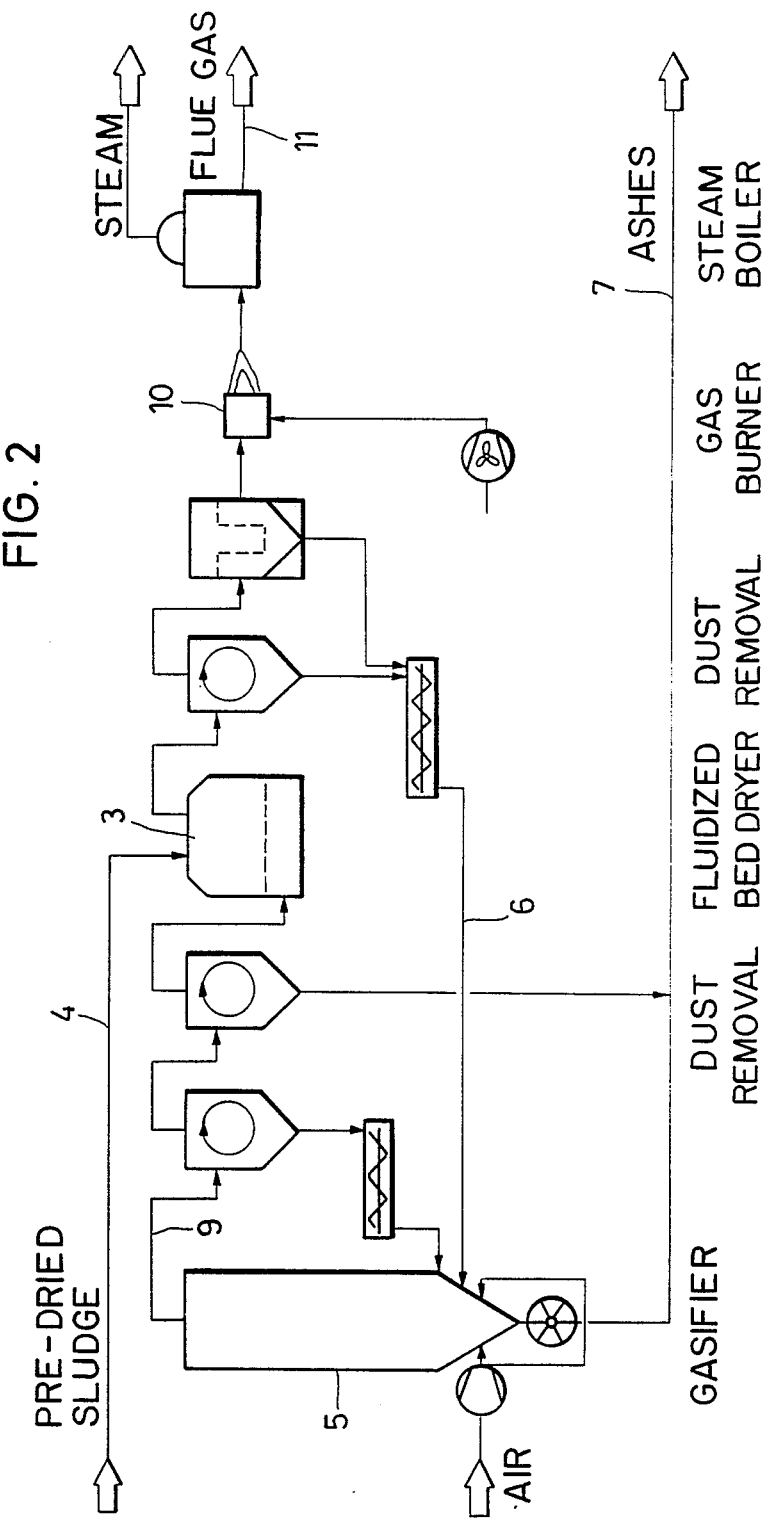

Referring to the basic diagram of FIG. 1, and the flow diagram of FIG. 2, the invention may be described as follows:

As shown in FIG. 1, the sludge 1 undergoes an indirect drying in dryer 2. The pre-dried sludge 4 is then subjected to direct drying in dryer 3, e.g., a fluidized-bed dryer. The sludge 6 leaving the direct dryer 3 is then sent for partial oxidation to reactor 5. The ashes 7 are the effluent of oxidation reactor 5.

The raw gas produced in oxidation reactor 5 and intended to be used for direct drying of the sludges, enters the direct dryer 3 via path 8 marked by a dotted line and leaves the dryer 3 via path 9 for being sent to a final oxidation plant 10, e.g., a steam-generating system, 11 designates the flue gas effluent.

According to a further embodiment of the invention, the sludge is dried, preferably in a fluidized-bed dryer, and subsequently subjected to partial oxidation, the gas produced in the oxidation reactor being introduced into the dryer as a drying gas. The fluidized bed drying, in itself, is known to the art.

A further embodiment provides that the drying gas which leaves the oxidation reactor and which cools down by passing through the fluidized bed reactor is purified before being subjected to final oxidation. Preferably, the final oxidation takes place in a fire-tube boiler, but other types of boilers may be used.

The method of the present invention offers many advantages over the state of the art. For example, the higher temperature of the final oxidation allows for a much better efficiency in energy recovery. The system could also possibly provide for the generation of steam which might be used for drying the sludge or for being fed into the steam mains. As an alternative, the heat can be recovered and used elsewhere.

Additionally, the special quality of the gases admitted to the burner permits the integration of a simple fire-tube boiler instead of the expensive radiant type boiler commonly used.

A further advantage of the inventive process is that this double-stage process allows for a compact construction of the equipment and, as has been determined by theoretical values, a single-line plant applying the process of this invention, can handle the same sewage sludge quantity as three big fluidized bed dryers, without considering pre-drying. Further advantages are that part of the sulfur contained in the sludge can be retained in the ashes through the addition of lime and that organic nitrogen compounds can be decomposed to a large extent in the first stage to form $NH_3$. Most of this ammonia can be decomposed to form $N_2$ and $H_2O$ when utilizing a suitable gas burner construction.

Even most of the heavy metals can be retained in the ashes which is a further substantial advantage of the invention.

The through-puts and temperatures of the numbered steams in the drawings are as follows:

1: sludge, G=6,000 kg dry substance/hr $H_2O$=34,000 kg/h, t=70° C.

4: pre-dried sludge, G=6,000 kg/hr $H_2O$=7,500 kg/hr

6: dry sludge, G=6,000 kg/hr $H_2O$=1,500 kg/hr

8: raw gas, G=19,200 kg/hr, t=900° C.

9: raw gas+water vapor, G=25,200 kg/hr, t=200° C.

10: flue gas, G=52,500 kg/hr, t=200° C.

The embodiment described above may, of course, be altered in many respects without leaving the fundamental idea of the invention. Thus, the invention is neither limited to a definite sludge type nor to a definite dryer or burner for final oxidation of the gas nor to a specific heat generator. Moreover, a spray dryer, a rotary tube dryer, etc. may be provided for instead of a fluidized bed dryer.

We claim:

1. In a process for the thermal treatment of sludge, wherein the sludge is subjected to indirect predrying, thereafter subjected to direct drying by a drying gas, and thereafter burned, the improvement which comprises:

performing said burning by partial oxidation of the dried separated substance obtaining ash and a combustible CO-containing flue gas;

using the flue gas as the drying gas in said direct drying step;

separating the cooled drying gas from the dried substance; and subjecting the cooled drying gas to a final oxidation by adding residual air thereto.

2. The process of claim 1 wherein direct drying of the sludge is carried out in a fluidized bed dryer, the dried sludge is thereafter subjected to partial oxidation in an oxidation reactor, and the gas produced from said oxidation is introduced into the dryer as a drying gas.

3. The process of claim 2 wherein the drying gas leaving the oxidation reactor is cooled by passing through the direct drying step and is purified prior to said final oxidation step.

4. The process according to claim 3 wherein the final oxidation step is carried out in a fire-tube boiler.

5. The process according to claim 1 wherein the final oxidation step is carried out in a fire-tube boiler.

* * * * *